US006954365B2

(12) United States Patent
Deguchi

(10) Patent No.: US 6,954,365 B2
(45) Date of Patent: Oct. 11, 2005

(54) REPLENISHING POWER SUPPLY SYSTEM

(75) Inventor: Shinichi Deguchi, Fujisawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/432,985

(22) PCT Filed: Sep. 20, 2002

(86) PCT No.: PCT/JP02/09696

§ 371 (c)(1), (2), (4) Date: May 28, 2003

(87) PCT Pub. No.: WO03/032462

PCT Pub. Date: Apr. 17, 2003

(65) Prior Publication Data

US 2004/0041473 A1 Mar. 4, 2004

(30) Foreign Application Priority Data

Oct. 2, 2001 (JP) ....................................... 2001-305980

(51) Int. Cl.[7] ................................................ H02M 7/00
(52) U.S. Cl. ........................................................ 363/65
(58) Field of Search ..................... 363/65, 123; 307/18, 307/19, 23, 29, 38, 41, 48, 64, 66

(56) References Cited

U.S. PATENT DOCUMENTS

| | | | | | |
|---|---|---|---|---|---|
| 4,884,242 | A | * | 11/1989 | Lacy et al. | 365/229 |
| 5,563,780 | A | * | 10/1996 | Goad | 363/71 |
| 5,920,475 | A | | 7/1999 | Boylan et al. | |
| 6,262,900 | B1 | | 7/2001 | Suntio | |
| 6,304,470 | B1 | * | 10/2001 | Isago et al. | 363/65 |
| 6,314,009 | B1 | | 11/2001 | Dittmer et al. | |
| 6,750,637 | B2 | * | 6/2004 | Nagaki et al. | 323/272 |
| 6,768,658 | B2 | * | 7/2004 | Perry | 363/65 |

FOREIGN PATENT DOCUMENTS

| | | | |
|---|---|---|---|
| JP | 07-121249 | A | 5/1995 |
| JP | 10-337015 | A | 12/1999 |
| JP | 2001-028807 | A | 1/2001 |
| WO | WO 99/41816 | A1 | 8/1999 |

* cited by examiner

*Primary Examiner*—Matthew V. Nguyen
(74) *Attorney, Agent, or Firm*—Foley & Lardner LLP

(57) ABSTRACT

In a replenishing power supply system, a plurality of DC/DC converters (5, 6 and 7) are connected in parallel, and the number of DC/DC converters (5, 6 and 7) to be started is changed based on the amounts of electric power used by auxiliary loads (11 and 12). Moreover, the DC/DC converters (5, 6 and 7) are started in order based on a predetermined sequence.

6 Claims, 10 Drawing Sheets

REPLENISHING POWER SUPPLY SYSTEM

TECHNICAL FIELD

The present invention relates to an improvement of a replenishing power supply system having both a main power supply and an auxiliary battery.

BACKGROUND ART

As a replenishing power supply system having a main power supply and an auxiliary battery, a fuel cell vehicle (FCV) or the like using a fuel cell as a main power supply and a secondary cell as an auxiliary battery described in Japanese Patent Application Laid-Open No. 2001-28807 has been known.

DISCLOSURE OF THE INVENTION

Generally, a voltage of electric power from a main power supply is converted by a DC/DC converter, and then supplied to an auxiliary battery or an auxiliary load. In the case of handling a large current, a large-capacity DC/DC converter is necessary. However, considering that a capacity of harness is also increased and so on, it is often practical to connect a plurality of DC/DC converters in parallel to one auxiliary battery.

In such a case, starting/stopping operations of the plurality of DC/DC converters are carried out by one signal (these operations are called parallel operations), and all the DC/DC converters are always run simultaneously. Then, if there is variance in voltage-current characteristics of the plurality of DC/DC converters, when run by the same voltage, a frequency of use (the frequency of use is equivalent to an accumulation of loads or currents) of a DC/DC converter having a largest current becomes higher compared with those of the other DC/DC converters. Therefore, the DC/DC converter having a high frequency of use becomes shorter in life compared with the other DC/DC converters. If it is defined that a system comes to an end of its life when one DC/DC converter reaches its life, dependence is placed on the DC/DC converter having a highest frequency of use, whereby system life is shortened.

Moreover, reuse as a system is allowed by replacing only the DC/DC converter that has reached its life. However, problems have been inevitable, such as necessity of time and labor for replacing components, and an increase in costs caused by necessity of components for replacement.

The first aspect of the present invention provides a replenishing power supply system for supplying electric power to a load, the replenishing power supply system comprising: a main power supply; a plurality of DC/DC converters for converting the electric power from the main power supply and outputting the electric power; and an auxiliary battery for charging the electric power converted by the plurality of DC/DC converters, wherein the plurality of DC/DC converters are connected in parallel, wherein the number of DC/DC converters to be started is changed according to an amount of the electric power used by the load, and wherein based on a predetermined starting sequence, the DC/DC converters are started in order.

BEST MODE FOR CARRYING OUT THE INVENTION

Hereinafter, detailed description will be made of the present invention by way of preferred embodiments with reference to the accompanying drawings.

(First Preferred Embodiment)

Figure 1:
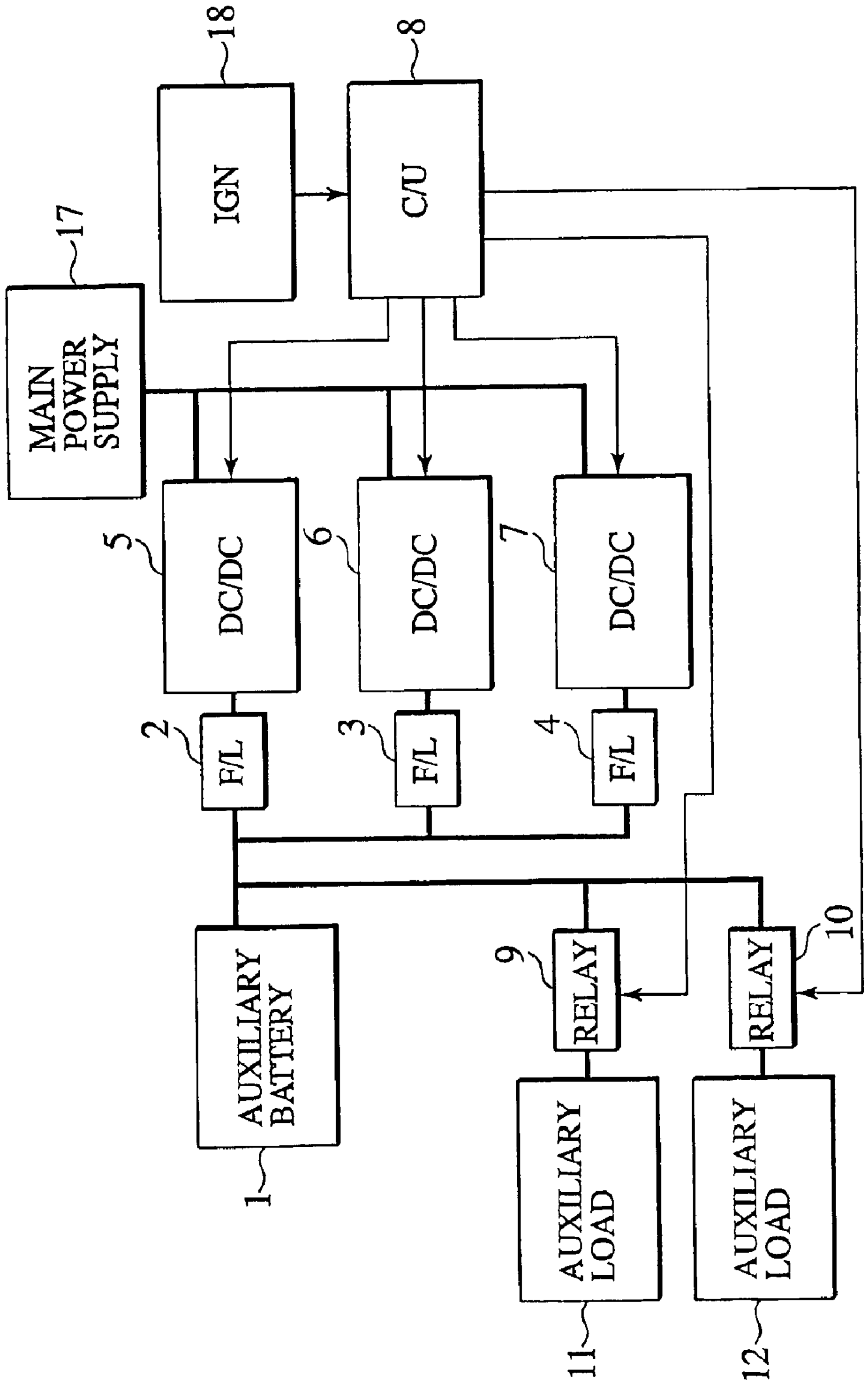
FIG. 1 is a configuration view of a replenishing power supply system for a vehicle according to a first embodiment of the present invention.

FIG. 1 is a configuration view of a replenishing power supply system of a first embodiment, which shows a vehicle replenishing power supply system to which the present invention is applied.

Three DC/DC converters 5 to 7 convert voltage of electric power from a main power supply 17 constituted by a fuel cell or the like. The DC/DC converters 5 to 7 are connected in parallel, and output electric power of each of the DC/DC converters 5 to 7 is supplied through each of fuses F/L2 to F/L4 to an auxiliary battery 1.

A control unit C/U 8 for outputting an operation command to each DC/DC converter is connected to the DC/DC converters 5 to 7, by which the electric power from the main power supply is converted according to the operation command.

Relays 9 and 10 are connected in parallel from the auxiliary battery 1. These relays are connected so as to continue electric power to auxiliary loads 11 and 12 by the command of the control unit C/U 8. The electric power converted by the DC/DC converters 5 to 7 is used for charging the auxiliary battery, and is used as a power supply for operating the auxiliary loads.

An ignition switch IGN 18 converts an operation of an ignition key by a driver into a signal.

Figure 2A:
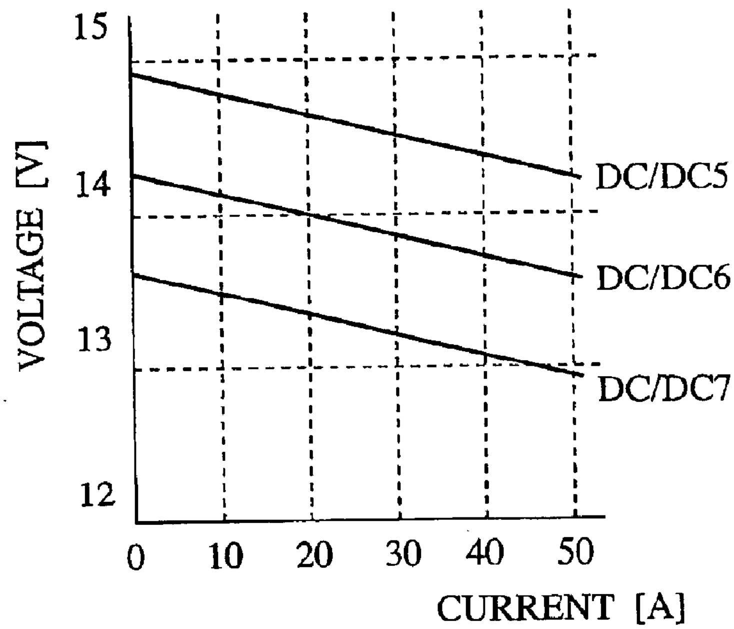
FIGS. 2A and 2B are examples showing voltage-current characteristics of DC/DC converters of the first embodiment.

Here, description will be made for operations of the DC/DC converters when voltage-current characteristics of individual outputs of the DC/DC converters 5 to 7 exhibit states similar to those of FIG. 2A When the three DC/DC converters 5 to 7 are simultaneously operated, a voltage is converted only by the DC/DC 5 if a total load is within 50 A.

If a total load is within the range from 50 A to 100 A, the DC/DC 5 continues its voltage conversion at 50 A, and the DC/DC 6 converts a voltage in the range of 0 A to 50 A.

If a total load is within the range from 100 A to 150 A, the DC/DC 5 and the DC/DC 6 continue voltage conversion at 50 A, and the DC/DC 7 converts a voltage in the range of 0 A to 50 A.

Figure 2B:
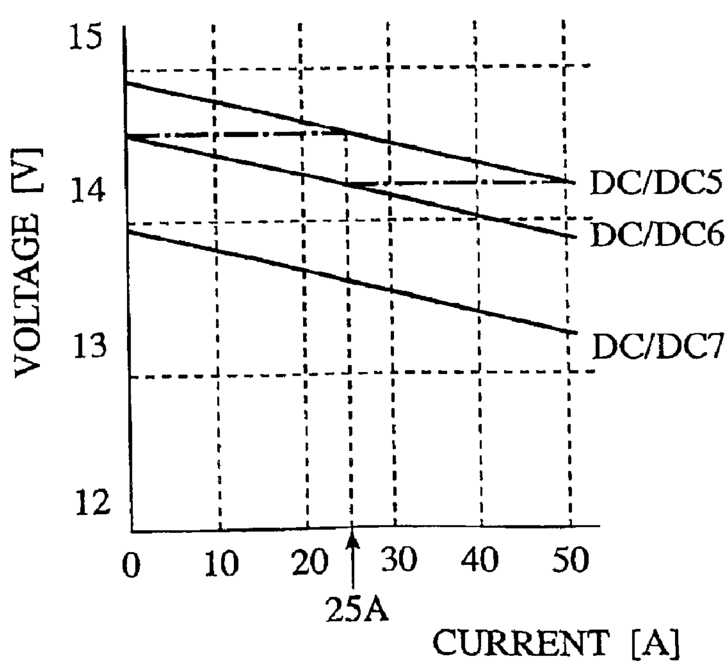

Next, description will be made for operations of the DC/DC converters when voltage-current characteristics of individual outputs of the DC/DC converters 5 to 7 exhibit states similar to those of FIG. 2B.

When the three DC/DC converters 5 to 7 are simultaneously operated, a voltage is converted only by the DC/DC 5 if a total load is within 25 A (the voltage at which only the DC/DC 5 is operated).

If a total load is within the range from 25 A to 75 A (in the range, a corresponding voltage at which the DC/DC 5 and the DC/DC 6 are operated), the DC/DC 5 converts a voltage in the range of 25 A to 50 A, and the DC/DC 6 in the range of 0 A to 25 A.

If a total load is within the range from 75 A to 100 A, the DC/DC 5 continues its voltage conversion, and the DC/DC 6 converts a voltage in the range of 25 A to 50 A.

If a total load is within the range from 100 A to 150 A, the DC/DC 5 and the DC/DC 6 continue voltage conversion, and the DC/DC 7 converts a voltage in the range of 0 A to 50 A.

Accordingly, by connecting the DC/DC converters 5 to 7 in parallel at all times, and simultaneously using them, the DC/DC converter 5 having a high conversion voltage always executes voltage conversion. Thus, a frequency of use (i.e., operation time) of the DC/DC converter 5 becomes high, thereby causing the DC/DC conductor 5 to reach its life earlier than the DC/DC converters 6 and 7.

Therefore, according to the present embodiment, the DC/DC converters 5 to 7 are started one by one in order based on a predetermined starting sequence according to the amount of electric power used by the load, and the starting sequence is changed based on a regulated sequence, thus dispersing frequencies of use of the DC/DC converters 5 to 7.

Hereinafter, a control operation regarding a start is described.

As a predetermined starting sequence, three patterns are provided as follows:

Pattern 1=DC/DC5→DC/DC6→DC/DC7

Pattern 2=DC/DC6→DC/DC7→DC/DC5

Pattern 3=DC/DC7→DC/DC5→DC/DC6

As the regulated sequence for changing the starting sequence, the patterns are changed in a manner of 1→2→3→1 for each changing of the ignition switch (IGN) from OFF to ON, i.e., for each turning ON (IGN ON) of the vehicle ignition key.

Figure 3:
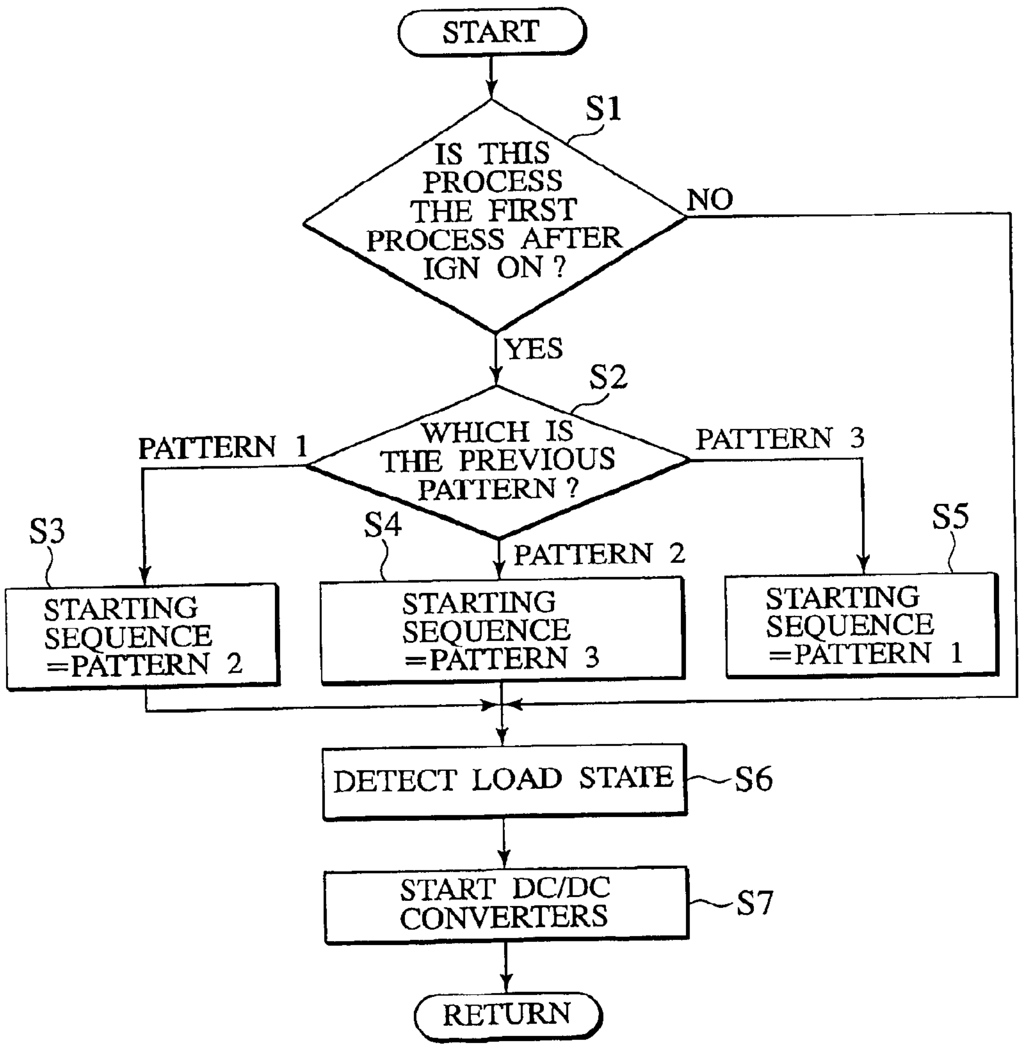
FIG. 3 is a flowchart showing control outline of the first embodiment.

FIG. 3 is a flowchart showing outline of control mainly carried out at the control unit C/U 8.

In step S1, determination is made as to whether this process is the first process after IGN ON. If it is the first process, a starting sequence is set in steps S2 to S5. In step S2, determination is made as to which of the patterns 1 to 3 is a previous pattern of the starting sequence belongs to. According to the pattern, the process proceeds to steps S3 to S5, and a current pattern of the starting sequence is decided. In step S6, load states (i.e., demanded electric power) of the auxiliary loads 11 and 12 are detected. In step S7, the number of DC/DC converters to be operated is decided according to the load states of the auxiliary loads 11 and 12. Further, the DC/DC converters are started according to the set pattern of the starting sequence.

Operations of the auxiliary loads 11 and 12 can be controlled by the C/U 8. Thus, electric power consumptions of the auxiliary loads 11 and 12 are memorized in the C/U 8, and the number of DC/DC converters to be operated is changed according to operating states (i.e., electric power using states) of the auxiliary loads 11 and 12. When the DC/DC converters are stopped, they are stopped in order inverse to that of the starting time.

In the first embodiment, the starting sequence was changed for each IGN ON. However, the changing is not limited to such, and the starting sequence may be changed for every several IGN ON and the like.

(Second Preferred Embodiment)

Figure 4:
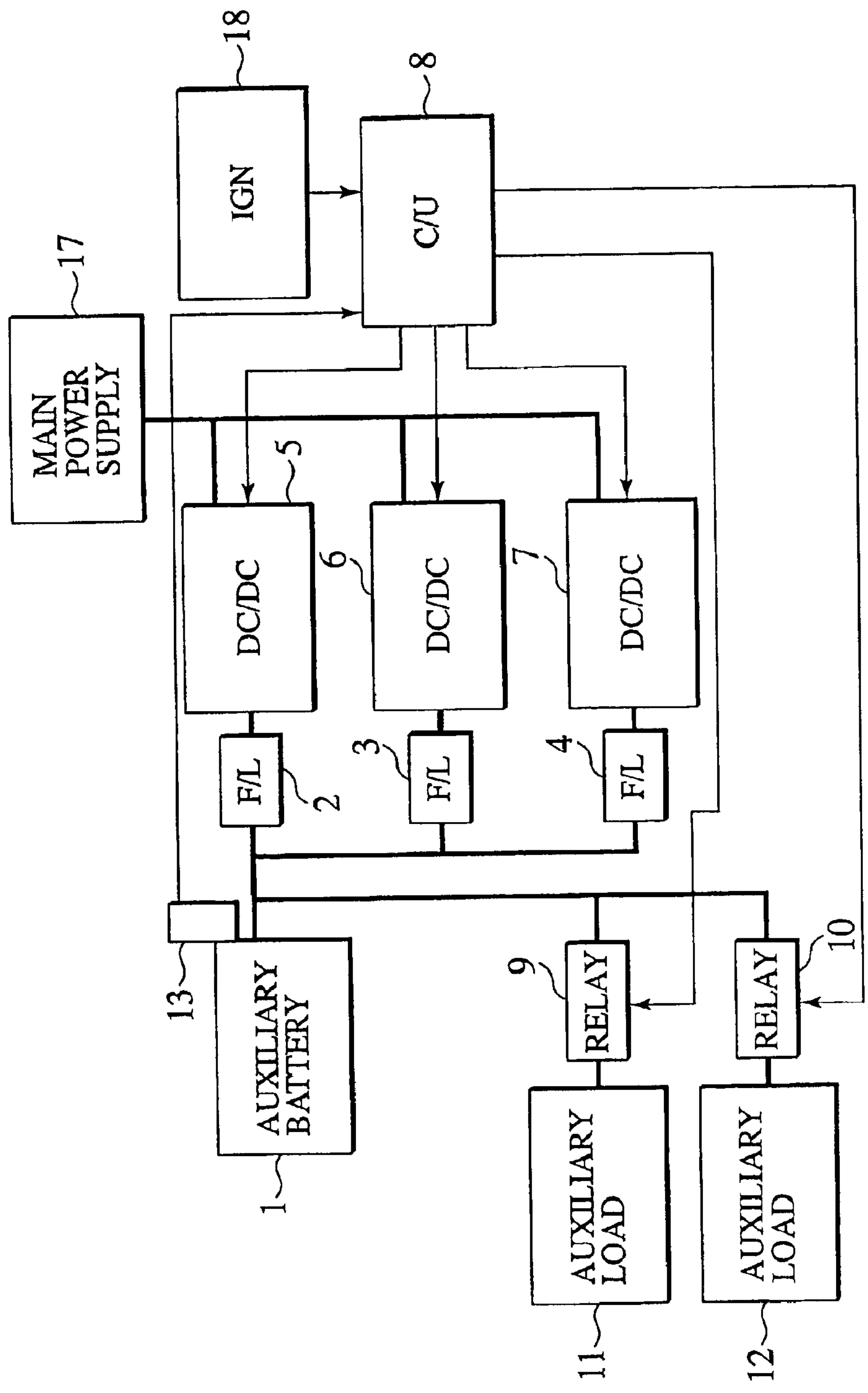
FIG. 4 is a configuration view of a vehicle replenishing power supply system according to a second embodiment of the present invention.

FIG. 4 shows a configuration of a second embodiment. Only portions different from those of the first embodiment will be described, and description of common portions will be omitted.

In addition to the configuration of the first embodiment, voltage detecting means 13 is provided in the auxiliary battery 1.

In the embodiment, a predetermined starting sequence is set according to a relation of voltage characteristics in voltage-current characteristics of each DC/DC converter (magnitude relation of output voltages when the same current is taken out).

Figure 5:
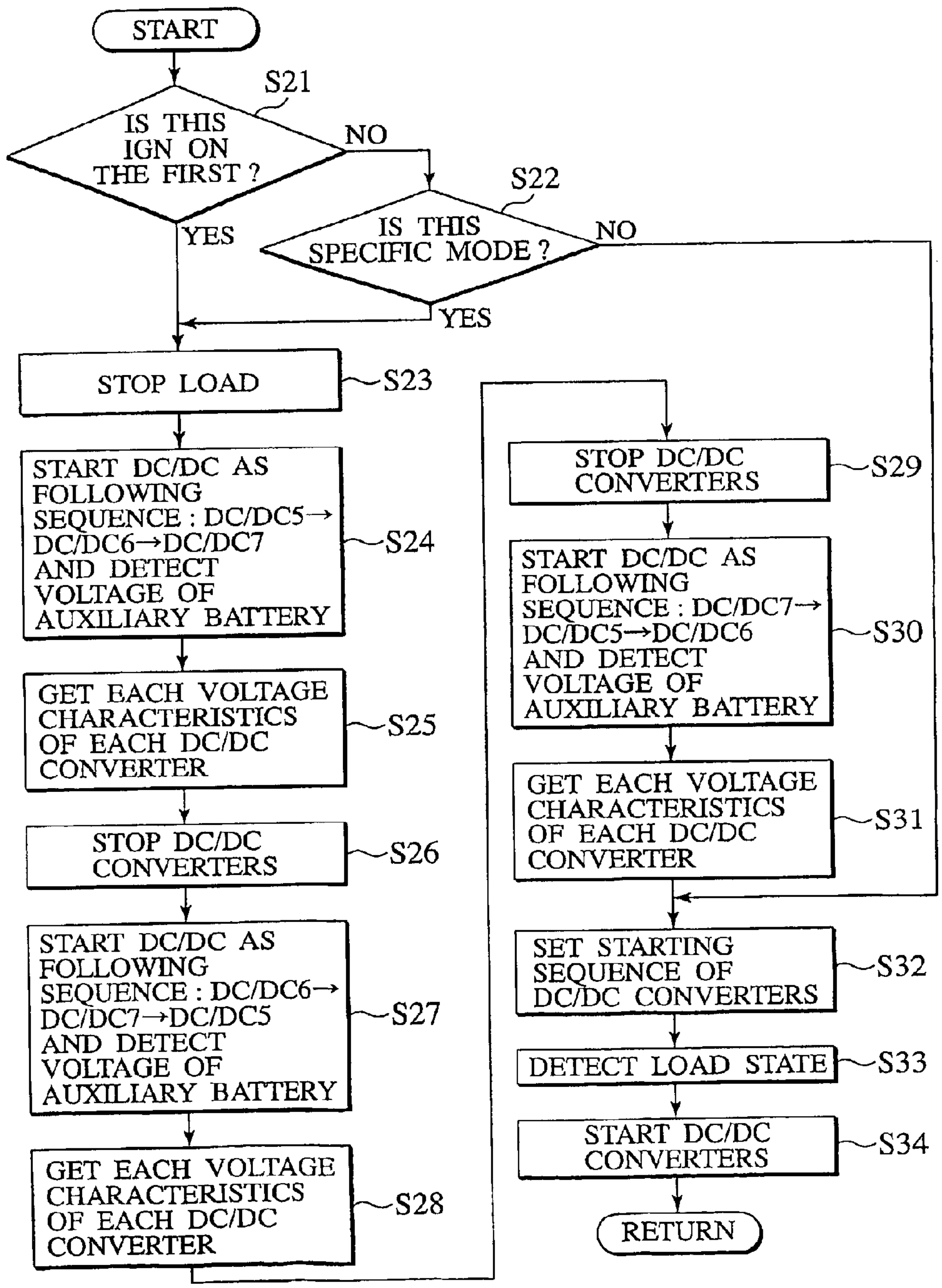
FIG. 5 is a flowchart showing control outline of the second embodiment.

FIG. 5 is a flowchart showing control in outline. In the control, setting of a starting sequence is carried out only when IGN ON is the first time (first after vehicle manufacturing), and on a specific mode (on repairing/inspection).

In step S21, determination is made as to whether IGN ON is the first time (first after vehicle manufacturing). Further, in step S22, determination is made as to whether the process is on a specific mode (on repairing/inspection).

In step S23, if either one of steps S21 or S22 is YES, the auxiliary loads 11 and 12 are stopped.

In step S24, a starting command is executed to the DC/DC converter 5. A voltage of the auxiliary battery 1 at this time is detected by the voltage detecting means 13, and sent the voltage to the C/U 8. Then, the DC/DC converter 6 is started after a fixed period (about 1 sec.). A voltage of the auxiliary battery 1 at this time is detected by the voltage detecting means 13, and sent the voltage to the C/U 8. Then, the DC/DC converter 7 is started after a fixed period (about 1 sec.). A voltage of the auxiliary battery 1 at this time is detected by the voltage detecting means 13, and the voltage is sent to the C/U 8.

In step S25, based on the voltage changes detected in step S24, a magnitude relation in voltage characteristics (i.e., conversion voltage) among the DC/DC converters 5 to 7 is acquired. Here, a voltage detected by the voltage detecting means 13 becomes a voltage of a DC/DC converter having a highest voltage characteristics among the plurality of DC/DC converters being operated. Thus, in the case of voltage characteristics of magnitude relations similar to those of FIGS. 2A and 2B, V5>V6, and V5>V7 are determined in this step, while a relation between V6 and V7 is not clear (V5, V6 and V7 respectively represent output voltages at the DC/DC converters 5, 6 and 7. The same holds true in the following).

In step S26, stopping commands are executed from the C/U 8 to the DC/DC converters 5 to 7.

In step S27, first, a starting command is executed from the C/U 8 to the DC/DC converter 6. A voltage of the auxiliary battery 1 at this time is detected by the voltage detecting means 13, and sent the voltage to the C/U 8. Then, the DC/DC converter 7 is started after a fixed period (about 1 sec.). A voltage of the auxiliary battery 1 at this time is detected by the voltage detecting means 13, and the voltage is sent to the C/U 8. Then, the DC/DC converter 5 is started after a fixed period (about 1 sec.). A voltage of the auxiliary battery 1 at this time is detected by the voltage detecting means 13, and the voltage is sent to the C/U 8.

In step S28, based on the voltage changes detected in step S27, a magnitude relation in voltage characteristics (i.e., the conversion voltage) among the DC/DC converters 5 to 7 is acquired. (V6>V7, V5>V7, and V5>V6).

In step S29, stopping commands are executed again from the C/U 8 to the DC/DC converters 5 to 7.

In step S30, first, a starting command is executed from the C/U 8 to the DC/DC converter 7. A voltage of the auxiliary battery 1 at this time is detected by the voltage detecting means 13, and the voltage is sent to the C/U 8. Then, the DC/DC converter 5 is started after a fixed period (about 1 sec.). A voltage of the auxiliary battery 1 at this time is detected by the voltage detecting means 13, and the voltage is sent to the C/U 8. Then, the DC/DC converter 6 is started after a fixed period (about 1 sec.). A voltage of the auxiliary battery 1 at this time is detected by the voltage detecting means 13, and the voltage is sent to the C/U 8.

In step S31, based on the voltage changes detected in step S30, a magnitude relation in voltage characteristics (i.e., the conversion voltage) among the DC/DC converters 5 to 7 is acquired. (V5>V7, and V5>V6, but the magnitude relation between V6 and V7 is not clear).

Figure 6:
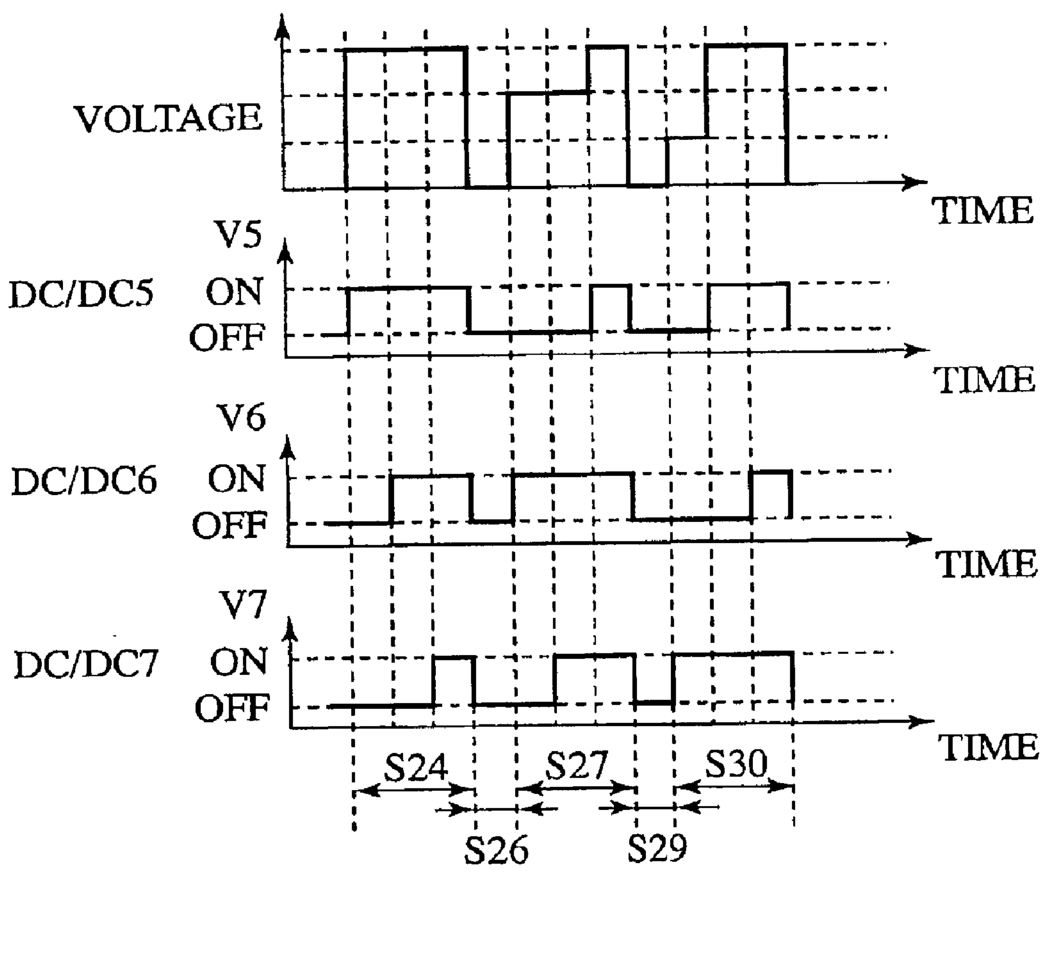
FIG. 6 is a time chart showing an operation of the second embodiment.

Incidentally, FIG. 6 shows a relation between the operation of the DC/DC converter and the change of voltage in steps S24 to S30.

In step S32, based on the results of steps S25, S28 and S31, a magnitude relation in voltage characteristics (V5>V6>V7 in this example) among the three DC/DC converters 5 to 7 is acquired. Then, a starting sequence after a normal starting time is set in the order of small voltage characteristics (DC/DC7→DC/DC6→DC/DC5 in this example).

Steps S33 and S34 are similar to steps S6 and S7 of the first embodiment.

Therefore, a frequency of use of a DC/DC converter having a small voltage characteristics becomes large at the time of starting. However, when a load becomes large, and the plurality of DC/DC converters are operated, a load of the DC/DC converter having a small voltage characteristics becomes small, so that deviation in frequencies of use can be canceled. Accordingly, life deviation among the converters can also be canceled, whereby a life of the replenishing power supply system is prolonged.

In the second embodiment, voltage characteristics of the DC/DC converters are measured after they are mounted on the vehicle. However, the measurement is not limited to this. For example, voltage characteristics of the DC/DC converters may be measured before they are mounted on the vehicle, and then a starting sequence may be stored beforehand in the C/U 8 based on a magnitude relation of the voltage characteristics. In such a case, the steps S21 to S32 described above can be abbreviated.

(Third Preferred Embodiment)

Figure 7:
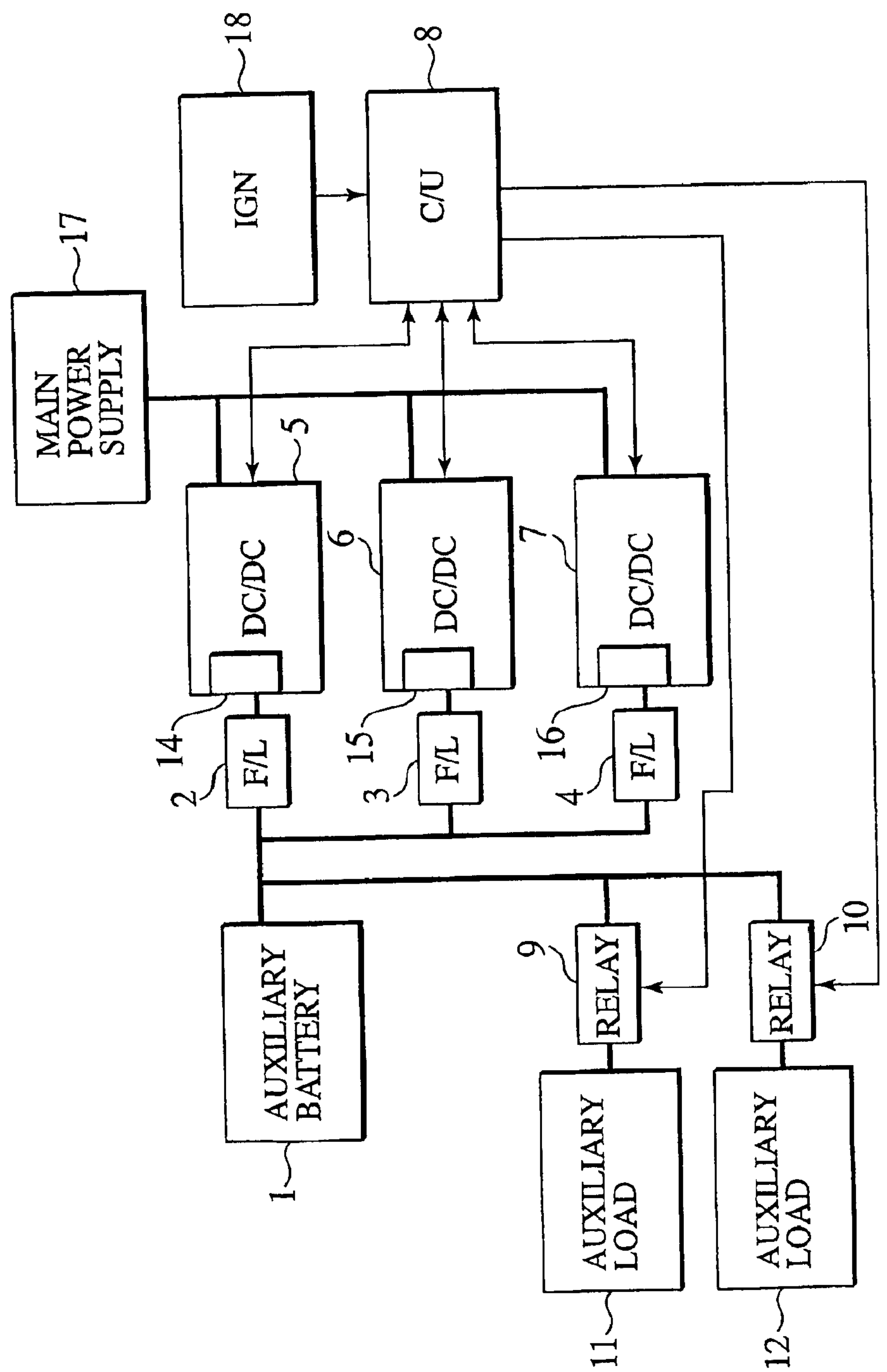
FIG. 7 is a configuration view of a vehicle replenishing power supply system according to a third embodiment of the present invention.

FIG. 7 shows a configuration of a third embodiment. Only portions different from those of the first and second embodiments will be described, and description of common portions will be omitted.

In addition to the configuration of the first embodiment, current detecting means 14 to 16 are provided in the DC/DC converters 5 to 7, respectively.

In the present embodiment, a predetermined starting sequence is set according to a relation of current characteristics in voltage-current characteristics of each DC/DC converter (a magnitude relation among output currents when the same voltage is outputted).

Figure 8:
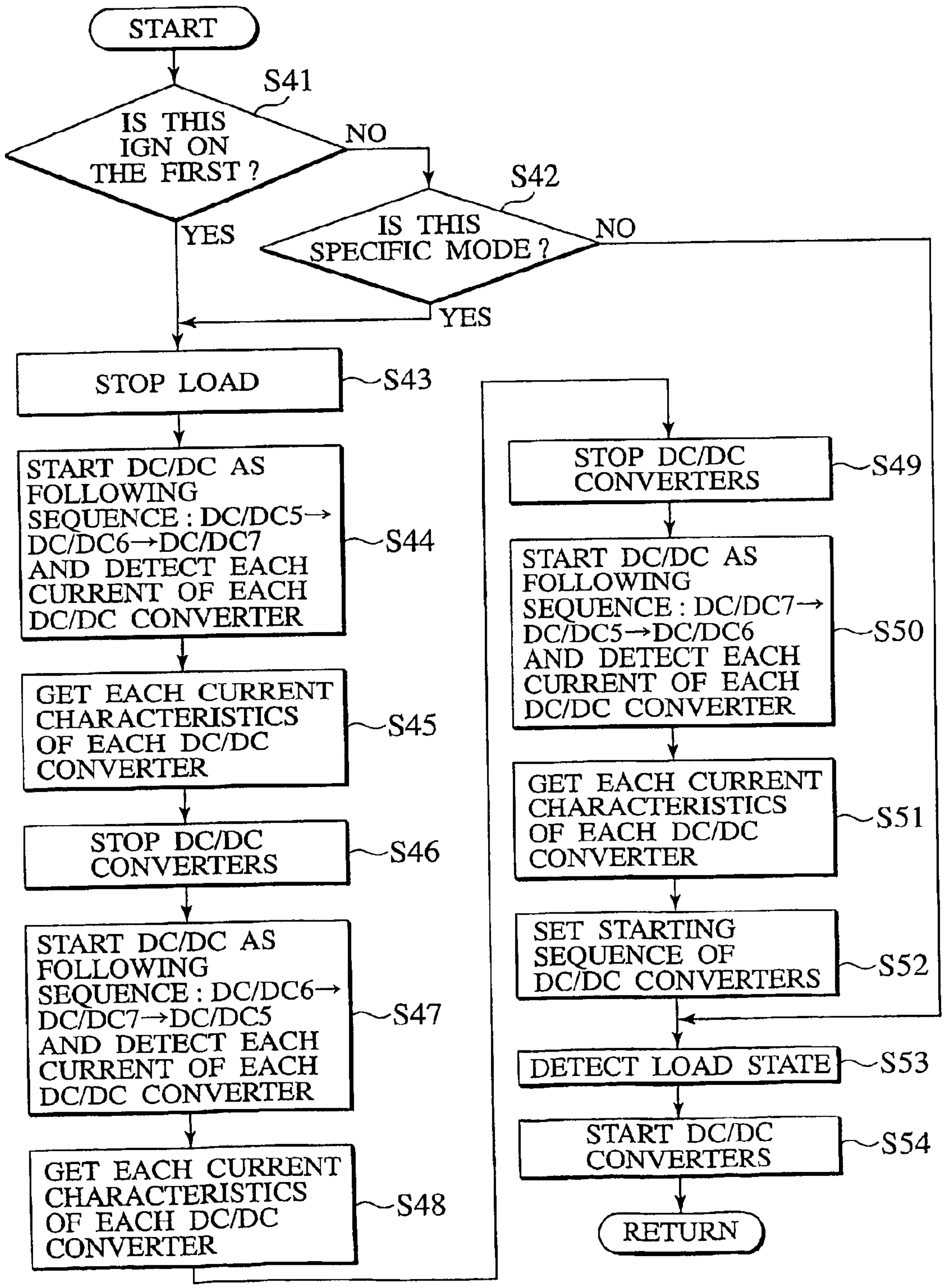
FIG. 8 is a flowchart showing control outline of the third embodiment.

FIG. 8 is a flowchart showing control in outline.

In the control, as is the case of the second embodiment, setting of a starting sequence is carried out only at first IGN ON (first after vehicle manufacturing), and on a specific mode (on repairing/inspection).

Steps S41 to S43 are similar to steps S21 to S23 of the second embodiment.

In step S44, first, a starting command is executed to the DC/DC converter 5. A current of the DC/DC converter 5 at this time is detected by the current detecting means 14, and the current is sent to the C/U 8. Then, the DC/DC converter 6 is started after a fixed period (about 1 sec.). A current of the DC/DC converter 6 at this time is detected by the current detecting means 15, and the current is sent to the C/U 8. Then, the DC/DC converter 7 is started after a fixed period (about 1 sec.). A current of the DC/DC converter 7 at this time is detected by the current detecting means 16, and the current is sent to the C/U 8.

In step S45, based on the current changes detected in step S44, a magnitude relation in current characteristics (magnitude of currents at the same voltage) among the DC/DC converters 5 to 7 is acquired.

As described above, if a load is low, a current only flows to a DC/DC converter having a large current characteristics. Thus, in the case of current characteristics of magnitude relations similar to those of FIGS. 2A and 2B, I5>I6, and I5>I7 are revealed in this step S45, while a magnitude relation between I6 and I7 is not clear (I5, I6 and I7 respectively represent currents at the DC/DC converters 5, 6 and 7. The same holds true in the following).

In step S46, stopping commands are executed at one time from the C/U 8 to the DC/DC converters 5 to 7.

In step S47, first, a starting command is executed from the C/U 8 to the DC/DC converter 6. A current of the DC/DC converter 6 at this time is detected by the current detecting means 15, and the current is sent to the C/U 8. Then, the DC/DC converter 7 is started after a fixed period (about 1 sec.). A current of the DC/DC converter 7 at this time is detected by the current detecting means 16, and the current is sent to the C/U 8. Then, the DC/DC converter 5 is started after a fixed period (about 1 sec.). A current of the DC/DC converter 5 at this time is detected by the current detecting means 14, and the current is sent to the C/U 8.

In step S48, based on the current changes detected in step S47, a magnitude relation in current characteristics among the DC/DC converters 5 to 7 is obtained. (I6>I7, I5>I7, and I5>I6).

In step S49, stopping commands are executed again from the C/U 8 to the DC/DC converters 5 to 7.

In step S50, first, a starting command is executed from the C/U 8 to the DC/DC converter 7. A current of the DC/DC converter 7 at this time is detected by the current detecting means 16, and the current is sent to the C/U 8. Then, the DC/DC converter 5 is started after a fixed period (about 1 sec.). A current of the DC/DC converter 5 at this time is detected by the current detecting means 14, and sent the current to the C/U 8. Then, the DC/DC converter 6 is started after a fixed period (about 1 sec.). A current of the DC/DC converter 6 at this time is detected by the current detecting means 15, and the current is sent to the C/U 8.

In step S51, based on the current changes detected in step S50, a magnitude relation in current characteristics among the DC/DC converters 5 to 7 is acquired. (I5>I7, and I5>I6, but a magnitude relation between I6 and I7 is not clear).

Figure 9:
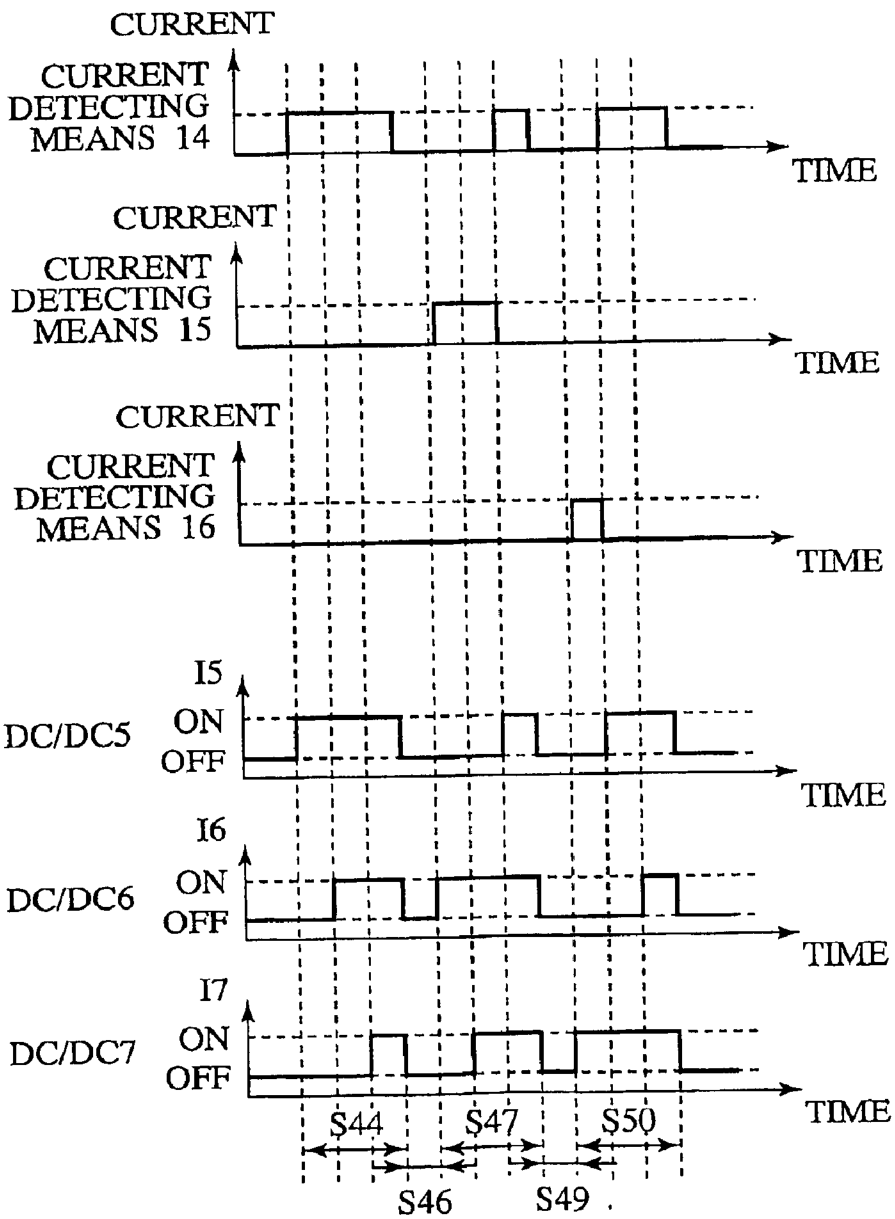
FIG. 9 is a time chart showing an operation of the third embodiment.

FIG. 9 shows a relation between the operation of the DC/DC converter and the change of current in steps S44 to S50.

In step S52, based on the results of steps S25, S28 and S31, a magnitude relation in current characteristics (I5>I6>I7 in this example) among the three DC/DC converters 5 to 7 is obtained. Then, a starting sequence after normal starting time is set in the order of small current characteristics (DC/DC7→DC/DC6→DC/DC5 in this example).

Steps S53 and S54 are similar to steps S6 and S7 of the first embodiment, respectively.

Therefore, a frequency of use of a DC/DC converter having a small current characteristics becomes large at time of starting. However, when a load becomes large, and the plurality of DC/DC converters are operated, a load of the DC/DC converter having a small current characteristics becomes small, whereby deviation in frequencies of use can be canceled.

In the third embodiment, current characteristics of the DC/DC converters are measured after they are mounted on the vehicle. However, the measurement is not limited to this. For example, current characteristics of the DC/DC converters may be measured before they are mounted on the vehicle, and then a starting sequence may be stored beforehand in the C/U 8 based on a magnitude relation of the current characteristics. In such a case, the steps S41 to S52 can be abbreviated.

(Fourth Preferred Embodiment)

A hardware configuration of a fourth embodiment is similar to that of the third embodiment. Description of portions common to those of the previous embodiments will be omitted.

In the present embodiment, a predetermined starting sequence is changed based on cumulative loads of DC/DC converters.

Figure 10:
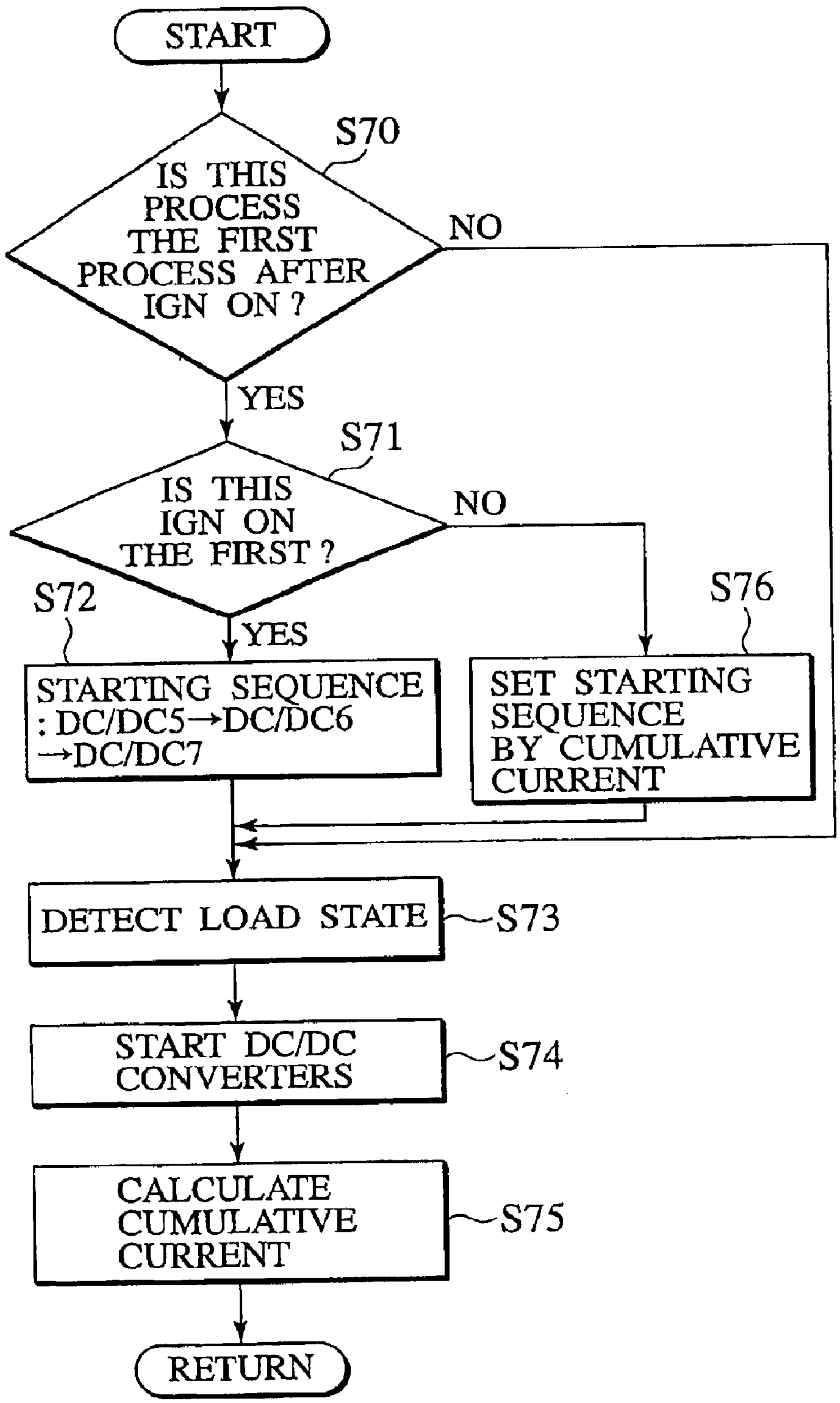
FIG. 10 is a flowchart showing control outline according to a fourth embodiment of the present invention.

FIG. 10 is a flowchart showing control in outline.

In step S70, determination is made so as to whether this process is the first process or not to pass through the step S70 after IGN ON. If it is the first process, in step S71, determination is made as to whether the IGN ON is the first or not (after vehicle manufacturing). If it is the first process, then in step S72, a starting sequence is set to DC5→DC/DC6→DC/DC7. Here, this sequence has no special significance, and an optional sequence may be set.

Steps S73 and S74 are similar to steps S6 and S7 of the first embodiment. Namely, the number of DC/DC converters to be operated is decided according to loads states (i.e., demanded electric power) of the auxiliary loads 11 and 12. Moreover, the DC/DC converters are started according to the set pattern of the starting sequence.

In step S75, currents on operation of the DC converters 5 to 7 are detected by the current detecting means 14 to 16 respectively, and the current is sent to the C/U 8. In the C/U 8, a cumulative value of each of the sent-in currents (i.e., a cumulative current) is calculated, and memorized. This cumulative current corresponds to a cumulative load of each of the DC converters. The cumulative current is also memorized in the C/U 8 after IGN OFF. In next IGN ON, the process proceeds from step S71 to step S76.

In step S76, the memorized cumulative currents of the respective DC/DC converters are compared with one another, thereby setting a starting sequence in the order of small cumulative currents at this time.

Accordingly, frequency of use of each of the DC/DC converters can be made uniform.

The present disclosure relates to subject matters contained in Japanese Patent Application No. 2001-305980, filed on Oct. 2, 2001, the disclosure of which is expressly incorporated herein by reference in its entirety.

While the preferred embodiments of the present invention have been described using specific terms, such description is for illustrative purposes. It is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention as defined in the following claims.

Industrial Applicability

As described above, according to the present invention, the amounts of electric power used by the loads are combined, and the DC/DC converters are started by a predetermined starting sequence. Therefore, a starting sequence is set to prevent concentration of loads, whereby loads of the plurality of DC/DC converters can be dispersed. Accordingly, a system life can be prolonged without any one of the converters shortened in life.

What is claimed is:

1. A replenishing power supply system for supplying electric power to a load, the replenishing power supply system comprising:

a main power supply;

a plurality of DC/DC converters for converting the electric power from the main power supply and outputting the electric power; and an auxiliary battery for charging the electric power converted by the plurality of DC/DC converters, wherein the plurality of DC/DC converters are connected in parallel, and based on a starting sequence, the plurality of DC/DC converters are started in order, and wherein the starting sequence of the plurality of DC/DC converters is changed according to an amount of the electric power used by the load.

2. The replenishing power supply system according to claim 1, wherein the starting sequence is changed by a regulated sequence.

3. The replenishing power supply system according to claim 1, wherein the starting sequence is set based on a voltage-current characteristics of each of the DC/DC converters.

4. The replenishing power supply system according to claim 3, wherein the starting sequence is set based on a voltage characteristics of each of the DC/DC converters.

5. The replenishing power supply system according to claim 3, wherein the starting sequence is set based on a current characteristics of each of the DC/DC converters.

6. The replenishing power supply system according to claim 1, wherein the starting sequence is changed based on a cumulative load of each of the DC/DC converters.

* * * * *